United States Patent [19]

Henshaw

[11] Patent Number: 4,809,993
[45] Date of Patent: Mar. 7, 1989

[54] STUFFING BOX SEALING DEVICE

[76] Inventor: Terrance L. Henshaw, 547 E. Minges Rd., Battle Creek, Mich. 49015

[21] Appl. No.: 63,195

[22] Filed: Jun. 17, 1987

[51] Int. Cl.$^4$ ............................................. F16J 15/26
[52] U.S. Cl. .................................... 277/110; 277/125; 277/148; 277/173
[58] Field of Search ............................... 277/123–125, 277/110, 165, 138, 148, 154, 173, 174, 176, 177

[56] References Cited

U.S. PATENT DOCUMENTS

| | | | |
|---|---|---|---|
| 1,776,911 | 9/1930 | Jones | 277/123 X |
| 1,780,764 | 11/1930 | Noble | 277/123 |
| 3,316,940 | 5/1967 | Gratzmuller | 277/110 X |
| 3,801,112 | 4/1974 | Dumaget | 277/124 |
| 4,306,728 | 12/1981 | Huperz et al. | 277/125 |

FOREIGN PATENT DOCUMENTS

| | | | |
|---|---|---|---|
| 446869 | 5/1936 | United Kingdom | 277/124 |
| 457025 | 11/1936 | United Kingdom | 277/123 |

OTHER PUBLICATIONS

Sketches A, B, C, D and E of Existing Sealing Devices, date unknown.

Primary Examiner—Robert S. Ward, Jr.
Attorney, Agent, or Firm—Flynn, Thiel, Boutell & Tanis

[57] ABSTRACT

A housing has an opening therein, a rod extends within the opening in the housing, and an annular seal arrangement is provided around the rod within the opening for effecting a fluid seal between the housing and the rod with respect to a fluid pressure which is present at a location along the rod on one axial side of the seal arrangement. The seal arrangement includes an annular washer part which is provided closely around the rod and an annular sleeve part axially adjacent the annular washer part, the annular sleeve part having an inside dimension which is less than an outside dimension of the washer part and which is substantially greater than an inside dimension of the washer part and an outside dimension of the rod. The washer part is located on a side of the sleeve part axially remote from the location at which the fluid pressure is present.

11 Claims, 8 Drawing Sheets

STUFFING BOX SEALING DEVICE

FIELD OF THE INVENTION

This invention relates to a sealing arrangement for effecting a fluid seal between a pressure-containing housing and a shaft or rod extending therethrough, for example for use in a reciprocating pump or compressor, a centrifugal pump or compressor, a rotary pump or compressor, or a valve, the sealing arrangement sealing any type of fluid, including any liquid and/or gas.

BACKGROUND OF THE INVENTION

The design of much equipment, such as pumps, compressors, and valves (and some miscellaneous pressure vessels) requires that a shaft, rod, plunger, or stem extend through the wall of the equipment. The internal cavity of the equipment is exposed to a pressure above or below atmospheric pressure. A sealing arrangement of some type is therefore required at the junction of the shaft and equipment wall to restrict the leakage of fluid from the equipment into the environment, or leakage from the environment into the equipment. This sealing arrangement is often installed in a cavity at the wall of the equipment, this cavity often being called a stuffing box. The sealing arrangement is usually in the form of rings of packing, or a mechanical seal. The packing takes many forms, including bulk fibers, fibers plaited or braided into a rope (and cut to fit the box and shaft), and molded or machined rings —often containing sealing lips.

The stuffing box of a reciprocating pump or compressor, because of the axial movement of the piston rod or plunger, is unsuitable for the application of a mechanical seal of the type used for a rotating shaft. Stuffing boxes of centrifugal and rotary units, because of internal or external environmental conditions, may also be unsuitable for mechanical seals. In such cases, rings of conventional or special packing are utilized to achieve a seal in the stuffing box.

Figure 1A:
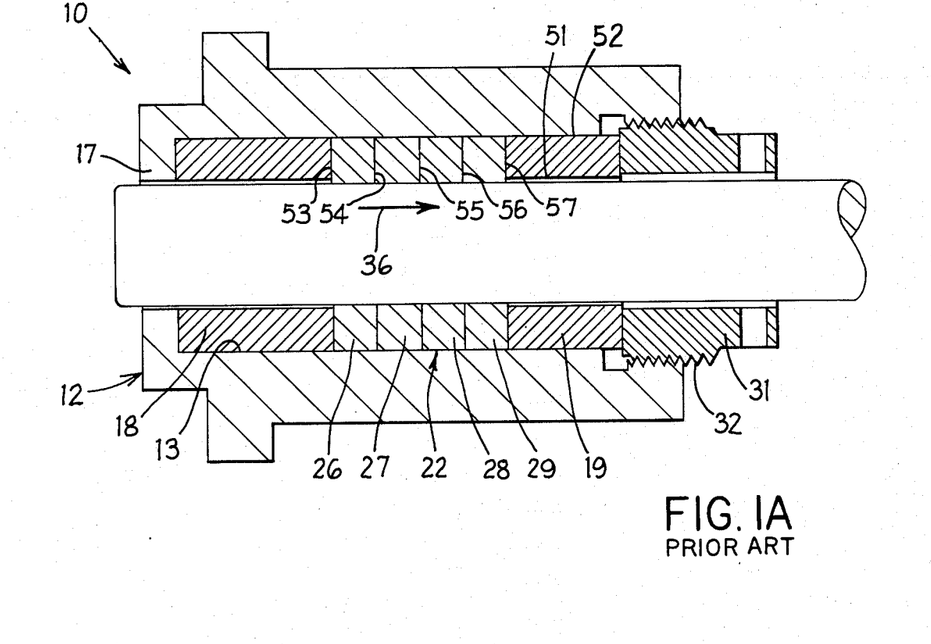
FIG. 1A is a cross-sectional side view of a conventional reciprocating pump stuffing box apparatus which has fluid pressure to the left and atmospheric pressure to the right.

FIG. 1A discloses a conventional stuffing box apparatus 10, including a housing 12 having therethrough a cylindrical opening or bore 13, having internal threads 16 at one end of the bore 13, and having a radially inwardly extending annular flange 17 at the opposite end of the bore 13. The housing 12 is sometimes referred to in the art as a "stuffing box", but the term "housing" is used herein to avoid confusion about whether a reference to "stuffing box" means the entire assembly or just the housing 12. Two spaced annular bushings 18 and 19 are disposed within the bore 13, and a stack 22 of four annular packing rings 26-29 is disposed within the bore 13 between the bushings 18 and 19. An annular gland 31 has external threads 32 which cooperate with the threads 16 on the housing 12, and rotation of the gland 31 relative to the housing effects variation of compressive forces exerted on the bushings 18 and 19 and stack 22 of packing rings by the gland 31 and flange 17. A cylindrical plunger or piston rod 34 extends axially movably through an opening 33 in the gland 31, and through each of the bushings 18 and 19 and each of the packing rings 26-29. The inside diameters of the packing rings 26-29 and bushings 18 and 19 are approximately equal to the outside diameter of the rod 34. A fluid pressure (which for purposes of this discussion is greater than atmospheric pressure) is present at the left end of the housing 12 and fluid attempts to flow rightwardly in FIG. 1A in the direction of the arrow 36 along the surface of the rod 34.

Figure 1B:
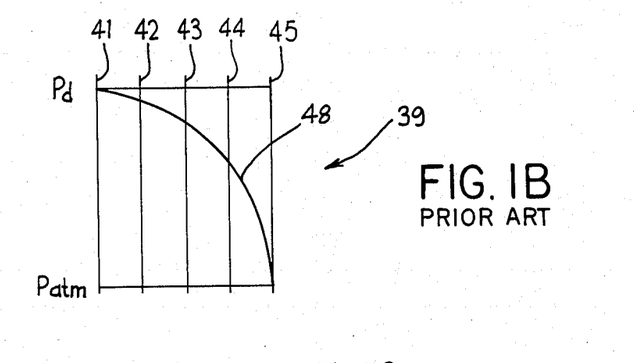
FIG. 1B is with a graph showing the approximate pressure distribution through a stack of packing rings which are components of the stuffing box apparatus of FIG. 1A.

A graph shown at 39 in FIG. 1B has lines 41–45 which correspond to the various axial ends 53–57 of the packing rings 26–29, and depicts with a curve 48 approximately how the packing rings 26–29 reduce the fluid pressure from the elevated pressure Pd present at the left end of the housing 12 to atmospheric pressure Patm. As evident from the graph 39, the packing ring 26 produces very little pressure drop, the packing ring 27 produces only a slightly greater pressure drop, and the packing ring 28 produces only a slightly greater pressure drop, whereas the packing ring 29 produces significantly more than one-half of the required pressure drop. Consequently, the packing ring 29 is subject to undesirably rapid wear, and often tends to extrude axially rightwardly adjacent to the radially inner surface or the radially outer surface of the bushing 19.

To achieve long packing life, it is necessary to minimize extrusion of the packing. To minimize extrusion, it is necessary that the clearance at 51 between the rod 34 and internal diameter of the backup bushing 19 be small. Higher pressures require smaller clearances. If this clearance is too large for the combination of packing type and pressure, the packing will extrude through the clearance, which results in leakage and premature failure. In this conventional stuffing box apparatus, the clearance at 52 between the outside diameter of the backup bushing 19 and the bore 13 must also be kept small to prevent packing extrusion. Such construction fixes the location of the backup bushing laterally in the stuffing box, and the close clearances require that the rod 34 operate very near the center of the box. Such precise alignment is seldom obtained or maintained in industrial equipment. The inevitable misalignment causes the rod 34 to rub the inside surface of the backup bushing 19, increasing the clearance at 51 and often scoring the rod, both of which contribute to short packing life.

This conventional type of stuffing box apparatus 10 contains a single stack 22 of packing rings. The total differential pressure thus exists across the single stack 22 of rings, the pressure gradient being approximately as indicated at 48 in FIG. 1B. The ring 29 on the atmospheric side of the stack 22 experiences the maximum pressure differential, does most of the sealing, and experiences the greatest wear and extrusion. Some proprietary lip-type packing designs have resolved this problem by incorporating into the packing a hard center section which absorbs the axial force from adjacent rings without transmitting the force to the lips, but such designs are limited to lip-type rings, which find limited applications. This problem is also partially resolved by a stuffing box design which divides the packing into two separate, independently-supported stacks, although such designs are special and require more axial space.

A third known design, used extensively on reciprocating compressors, provides a segmented stuffing box with hard segmental rings. This design does provide for independent support of individual sets of packing, and allows for more radial misalignment, but a special box and packing are required, and a fairly high degree of skill is required for maintenance. Application to pumps has been successful in only a small range of services.

As a result, there has been a need for a sealing device which would allow operation at higher pressures and/or with longer life, that would be installable, with minimal skill, in a conventional stuffing box, and that would allow for misalignment of the rod with the stuffing box.

SUMMARY OF THE INVENTION

An object of the present invention is to provide a device which can be easily installed in a conventional stuffing box, which utilizes conventional or special packings, which will operate at higher pressures, which will allow for misalignment of the rod, which will require no adjustment, and which will require less frequent maintenance.

According to the invention, a housing has an opening therein, a rod extends within the opening in the housing, and an annular seal arrangement is provided around the rod within the opening for effecting a fluid seal between the housing and the rod with respect to a fluid pressure which is present at a location along the rod on one axial side of the seal arrangement. The seal arrangement includes an annular washer part which is provided closely around the rod and an annular sleeve part axially adjacent the annular washer part, the annular sleeve part having an inside dimension which is less than an outside dimension of the washer part and which is substantially greater than an inside dimension of the washer part and an outside dimension of the rod. The washer part is located on a side of the sleeve part axially remote from the location at which the fluid pressure is present.

BRIEF DESCRIPTION OF THE DRAWINGS

These and other aspects, objects, and advantages of the invention will be more fully understood and appreciated by reference to the following description of the preferred embodiments shown in the appended drawings, in which.

DETAILED DESCRIPTION

Figures 2A, 2B:
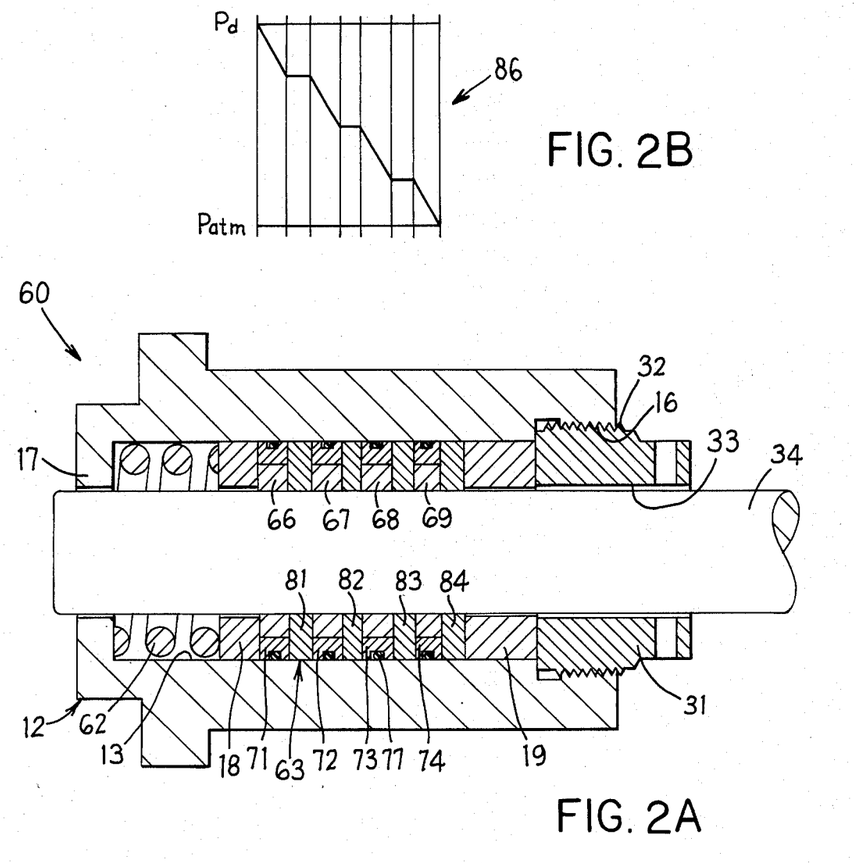
FIG. 2A is a cross-sectional side view of a stuffing box apparatus embodying the present invention.
FIG. 2B is a graph showing the approximate pressure distribution through a packing arrangement of the stuffing box of FIG. 2A.

FIG. 2A shows a stuffing box apparatus 60 which embodies the present invention. Several components of the stuffing box apparatus 60 are identical or similar to components in the conventional device of FIG. 1A and have therefore been identified with the same reference numerals, including the housing 12, the bushings 18 and 19, and the gland 31. These identical or similar parts are not described in detail, and the following discussion will instead focus on the differences between the inventive device of FIG. 2A and the conventional device of FIG. 1A.

Figure 3A:
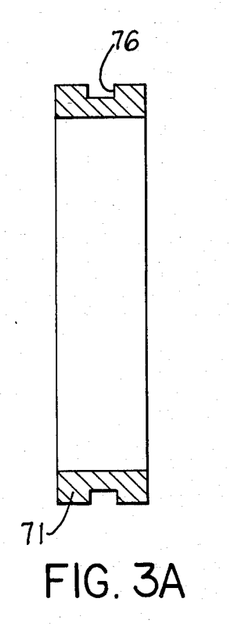
FIGS. 3A and 3B are respectively a sectional side view and an elevational end view of one of several sleeves which are components of the stuffing box apparatus shown in FIG. 2A.
Figure 3B:
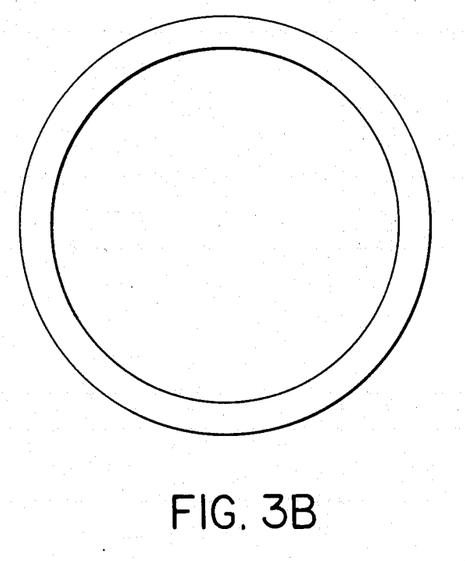
Figure 4A:
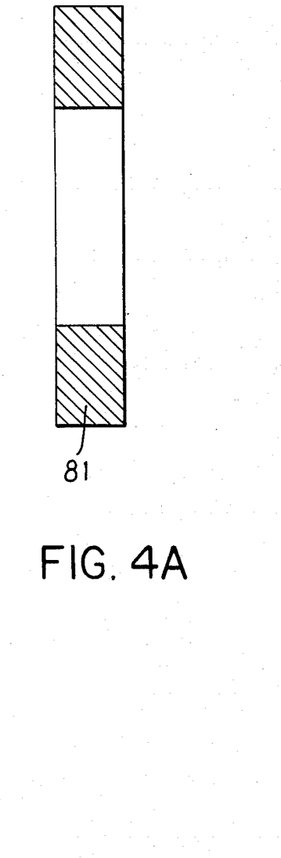
FIGS. 4A and 4B are respectively a sectional side view and an elevational end view of one of several annular backup discs which are components of the stuffing box apparatus shown in FIG. 2A.
Figure 4B:
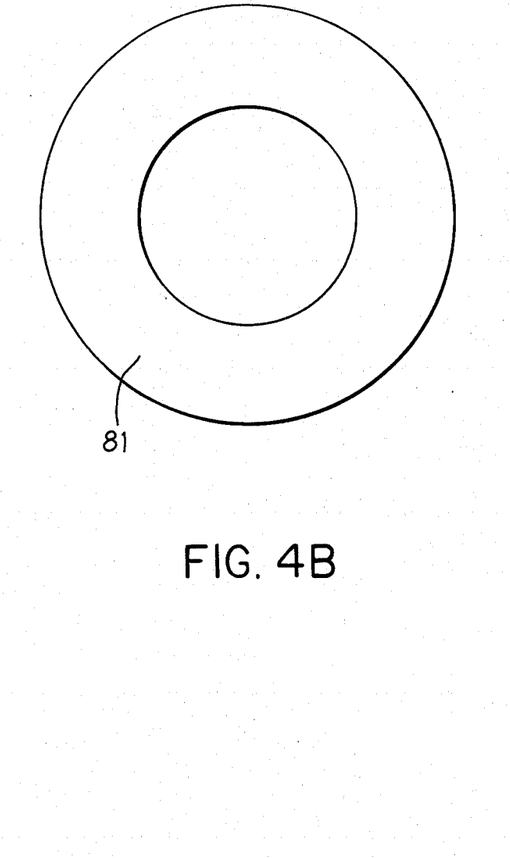
Figure 7:
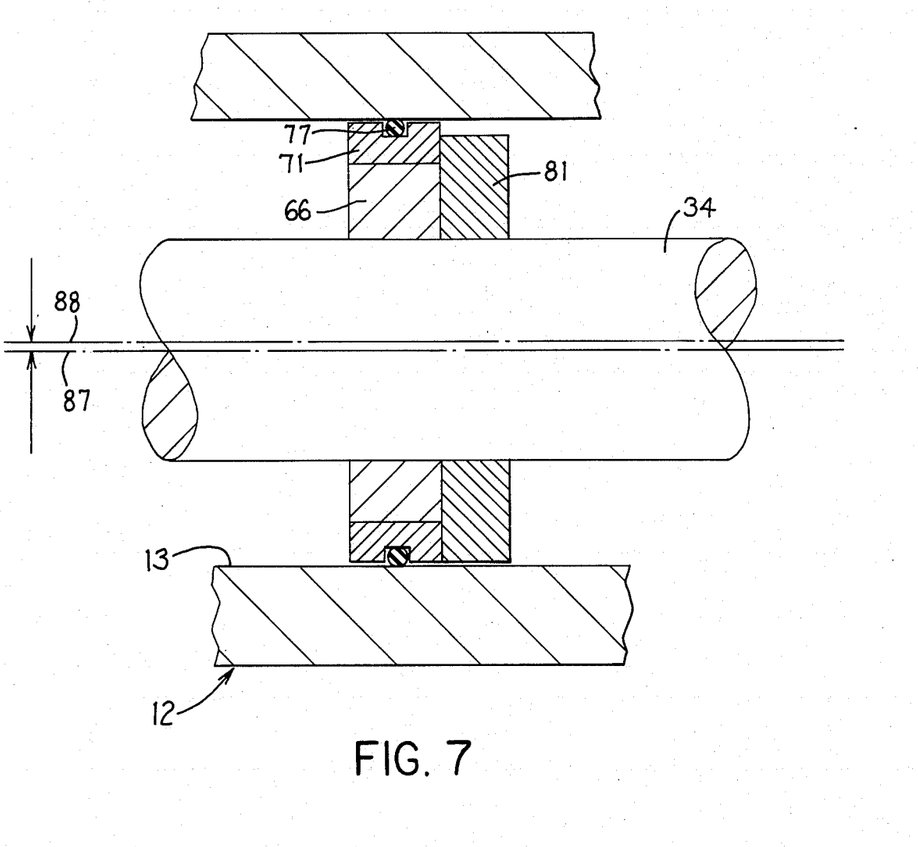
FIG. 7 is a diagrammatic sectional view of selected parts from the embodiment of FIG. 2A and shows the ability of a backup disc to move laterally to compensate for misalignment of a rod while still avoiding any gap near the radially outer surface of the packing and while retaining close backup clearance near the radially inner surface of the packing.

In the device of FIG. 2A, a helical compression spring 62 encircles the rod 34 and has its ends disposed against the flange 17 on the housing 12 and the bushing 18. Disposed between the bushings 18 and 19 is a packing stack 63 which includes four spaced annular packing rings 66–69 which closely encircle the rod 34 and are each in turn closely concentrically encircled by a respective one of four annular sleeves 71–74. As an alternative, it would be possible to provide two or more separate packing rings within each of the sleeves 71–74. The packing rings 66–69 are not connected to the sleeves 71–74 in the preferred embodiment, but it would be within the scope of the invention to secure each packing ring to the sleeve encircling it with an appropriate adhesive or by making them respective integral portions of a single molded part. As evident from FIGS. 2A, 3A and 3B, each of the sleeves 71–74 has a groove 76 in a radially outwardly facing surface thereof, each groove having therein an annular sealing ring or O-ring 77 which sealingly engages the inwardly facing surface of the opening 13 in the housing 12. Each sleeve 71–74, and the respective packing ring or rings 66–69 disposed concentrically therein, has immediately to the right thereof, or in other words on the low pressure side thereof, a respective one of four annular backup discs or washers 81–84. Each of the discs 81–84 has an inside diameter which is approximately equal to the outside diameter of the shaft 34, but has an outside diameter which is slightly less than the inside diameter of the bore 13 (as best seen in FIG. 7). As evident from the graph 86 in FIG. 2, approximately equal pressure drops occur across each of the packings 66–69.

Each of the packing rings 66–69 can be made of polytetrafluoroethylene (commonly known as Teflon) or nylon cloth impregnated with an elastomer. Suitable materials for the sleeves 71–74 and the discs 81–84 are stainless steel and bronze, respectively.

Figure 6:
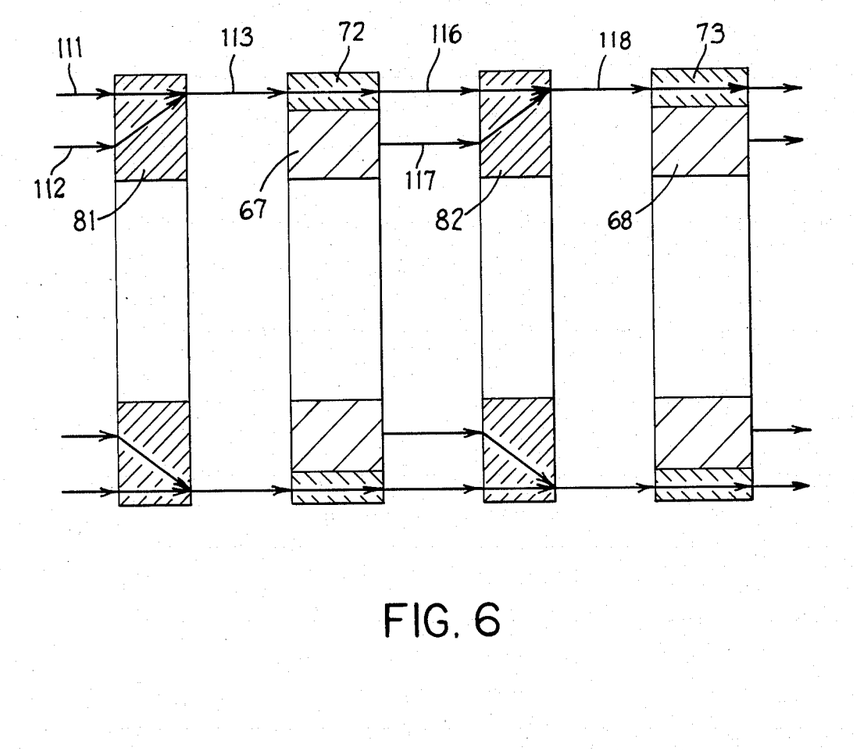
FIG. 6 is a diagrammatic sectional view of selected parts from the embodiment of FIG. 2A and shows how certain axial forces are transmitted around the outside of each ring of packing.

As shown in FIG. 6, the axial forces 111 and 112 generated by the sleeve 71 and packing ring 66 of FIG. 2A are applied to the disc 81 which in turn applies them at 113 to the sleeve 72 rather than to the packing ring 67. Similarly, axial forces 116 and 117 respectively applied to the disc 82 by the sleeve 72 and packing ring 67 are all applied at 118 to the sleeve 73 rather than to the packing ring 68. Thus, axial forces generated by each packing ring are not applied to the next packing ring.

In the preferred embodiment, each of the packing rings 66–69 is supported radially by its own sleeve 71–74 on its outside surface, and is supported axially by its own backup bushing or disc 81–84 on the low-pressure side thereof. One or more such packing assemblies are contained in a single stuffing box arrangement 60. If more than one assembly, they are stacked in series in a straight bore as shown in FIG. 2A, or could be provided in respective step portions of a stepped bore. The entire stack is retained in the box by the gland 31, as shown in FIG. 2A, or by any other method, such as a flange (separate from or integral with the stuffing box) or a snap ring.

Referring to FIGS. 2A and 6, when each packing ring 66–69 is exposed to hydraulic pressure (from the left), the pressure creates a force which pushes the packing ring to the right. This force is absorbed by the associated backup disc 81–84 which transmits it to the left face of the subsequent sleeve 72–74 or bushing 19. The hydraulic pressure acting upon the sleeve also creates a force which is absorbed by the backup disc and is transmitted to the subsequent sleeve 72–74 or bushing 19. The force transmitted to the subsequent sleeve passes around, rather than through, the packing ring therein. As discussed above, the paths of these forces are as shown schematically in FIG. 6. The pressure which exists downstream of each packing assembly or sealing set reduces the force created by that packing set or sealing set.

Because there is no accumulation of forces within the series of packing sets, as is the case with a single stack of conventional packing rings as shown in FIG. 1A, each sealing set seals approximately equally so as to establish approximately equal pressure differentials, as shown at 86 in FIG. 2B. Each packing set then, in effect, becomes a small stuffing box within the larger box; each taking a proportionate share of the total pressure differential. Such sharing of the pressure allows use of packing rings which are conventionally limited to lower pressure applications, and also extends the life of the packing beyond that experienced in conventional applications.

In addition to the uniformly stepped pressure gradient described above, the invention provides for an ability of the sealing assembly to compensate for a lateral misalignment of the rod 34 with respect to the stuffing box. For example, referring to FIG. 7, the rod 34 is shown in a position in which its centerline 87 is offset slightly from the centerline 88 of the bore 13. The radial clearance at the outside diameter of the backup disc 81 is sufficient to allow for such misalignment without coincidentally providing a clearance into which the packing 66 may extrude. In particular, when the disc 81 has been moved laterally by the off-center rod as shown in FIG. 7, the resulting radial gap between the disc 81 and housing 12 is shielded from the packing ring 66 by the sleeve 71. The sleeve 71 maintains a minimal clearance at the radially outer side of the packing ring, minimizing packing extrusion. Additionally, the packing sleeve 71 can be arranged to allow a degree of lateral movement of the packing ring 66. The clearance between the radially outer surface of the sleeve 71 and the inner surface of the bore 13 establishes the allowable magnitude of this lateral movement. Where the O-ring 77 is used to seal between the sleeve 71 and the housing as shown in FIG. 7, the maximum allowable clearance is established by the material of the O-ring and the pressure differential across the O-ring. If the rod misalignment is large enough to require a clearance between the sleeve and housing which cannot be sealed by an O-ring, another sealing device such as a piston ring may be utilized at this junction, or sealing may be accomplished at different locations within the assembly.

To obtain full benefit of the self-aligning characteristic of the inventive arrangement, it is necessary that the stack of sealing assemblies not be clamped in the box during the initial operation of the equipment. Once operating conditions have been established, the assemblies may be clamped. To eliminate the possibility of premature clamping, the stuffing box is preferably provided with the internal compression spring 62 shown in FIG. 2A. This spring may take many forms, such as the large single coil shown, a set of small coils, or a thick elastomeric washer.

Figure 5A:
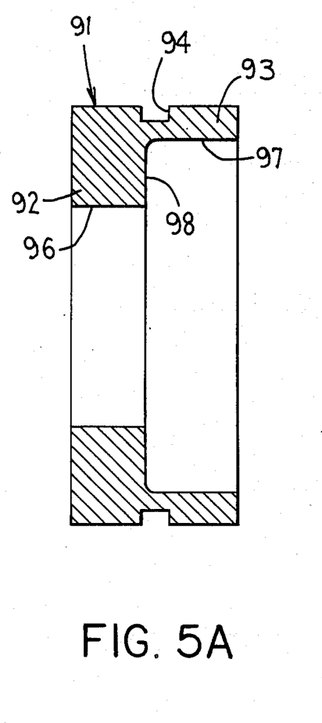
FIGS. 5A and 5B are respectively a sectional side view and an elevational end view of a single-piece cup which can be substituted for a sleeve and a disc in the embodiment of FIG. 2A.
Figure 5B:
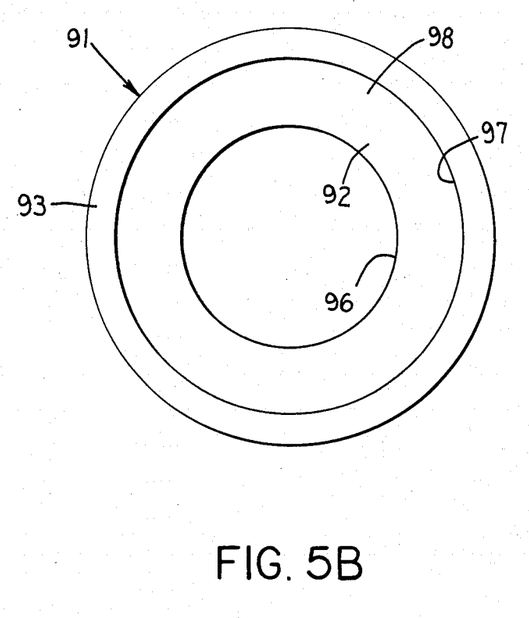

According to a variation of the invention, each of the sleeves 71–74 and the associated disc 81–84 in the embodiment of FIG. 2A can be secured to each other by welding or a suitable adhesive, or can be replaced by a unitary annular cup 91 which is illustrated in FIGS. 5A and 5B. The cup 91 includes an annular disc or washer portion 92 and an annular sleeve portion 93 which projects axially outwardly from the washer portion 92. The cylindrical outer surface of the cup 91 has a groove 94 therein. The radially inner surface 96 of the washer portion 92 has a smaller diameter than the radially inner surface 97 of the sleeve portion 93, and the surfaces 96 and 97 are connected by an axially facing annular shoulder 98. The cup 91 could, for example, be substituted for the sleeve 71 and associated disc 81 in the embodiment of FIG. 2A.

Figure 8A:
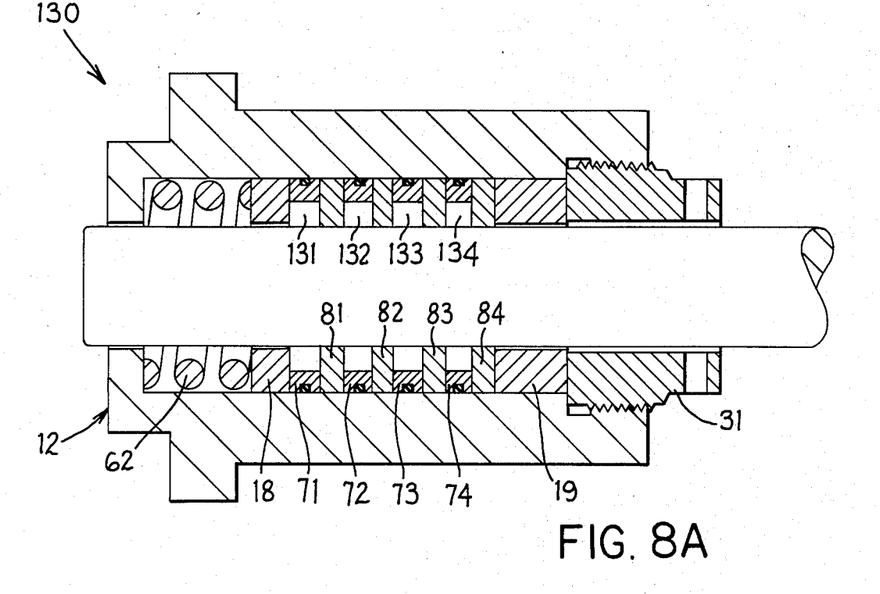
FIG. 8A is a cross-sectional side view of an alternative embodiment of the stuffing box apparatus of FIG. 2A.
Figure 8B:
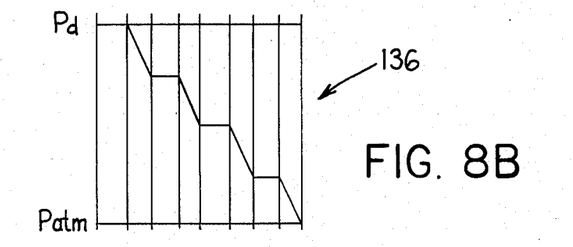
FIG. 8B is a graph showing the approximate pressure decay across a sealing arrangement of the stuffing box of FIG. 8A.

FIG. 8A shows a stuffing box apparatus 100 which is an alternative embodiment of the stuffing box apparatus 60 of FIG. 2A. The stuffing box 100 is identical to the stuffing box 60, except that the four annular packing rings 66–69 in the embodiment of FIG. 2A have been omitted in the embodiment of FIG. 8 so as to leave annular spaces 131–134. As shown in the graph at 136 in FIG. 8B, an approximately uniform pressure differential is produced by each of the annular discs 81–84 in FIG. 8A.

Summarizing, the inventive device can include one or more sleeves 71–74, each containing one or more rings of packing 66–69 (or the equivalent), and each supported by its own backup disc 81–84. The sleeve may be separate from the backup disc as shown in FIG. 7, or integral with it as shown at 92 and 93 in FIGS. 5A and 5B. The backup disc can be made so as to have a clearance at its radially outer surface which would be unacceptable in a conventionally-packed stuffing box of the type shown in FIG. 1A. This clearance allows the disc to operate off-center in the stuffing box, as shown in FIG. 7, and the associated sleeve shields the gap or clearance at the outer surface of the disc to prevent the packing from extruding into the gap. The sleeve may also be allowed to float radially, the degree of allowable float being determined by the operating pressure and the method of sealing the sleeve to the stuffing box.

The inventive device is able to tolerate higher pressures by providing the separate independent sets of packing within the stuffing box in order to distribute the pressure among the different sets. Instead of the forces from the entire packing in a stuffing box accumulating and all being transmitted onto the outer (atmospheric) packing ring, each sleeve and disc transmit the accumulated forces around the outside of the next packing ring as shown in FIG. 6. Therefore, each packing within a sleeve feels only the effect of the pressure difference across that sleeve.

A single sleeve and backup disc according to the invention are generally capable of operating at a pressure higher than a conventional stuffing box of the type shown in FIG. 1A, because of the unique ability of maintaining minimal extrusion clearances in the packing support pieces.

A set of one or more sleeves and discs, if made with appropriate clearances, can be arranged to operate with no packing rings whatsoever, as shown in FIG. 8A.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus which includes a housing having an opening therein, a rod extending within said opening in said housing, and annular seal means provided around said rod within said opening for effecting a fluid seal between said housing and said rod with respect to a fluid pressure which is present at a location along said rod on one axial side of said seal means, the improvement comprising wherein said seal means includes an annular washer part which is provided closely around said rod and an annular sleeve part axially adjacent said annular washer part, said annular sleeve part having an inside dimension which is less than an outside dimension of said washer part and which is substantially greater than an inside dimension of said washer part and an outside dimension of said rod, said washer part being located on a side of said sleeve part axially remote from said location at which said fluid pressure is present, and wherein said sleeve part and said washer part are structurally separate components which can move relative to each other in directions extending transversely of said rod.

2. The apparatus of claim 1, including an annular packing ring which extends around said rod within said sleeve part, which has an inwardly facing surface closely adjacent said rod, which has an outwardly facing surface in engagement with an inwardly facing surface of said sleeve part, and which is disposed against an axially facing surface on said washer part.

3. The apparatus of claim 2, wherein said packing ring is fixedly secured to said sleeve part.

4. The apparatus of claim 2, wherein said packing ring and said sleeve part are respective integral portions of a single component.

5. The apparatus of claim 1, wherein said seal means includes a further annular sleeve part disposed on a side of said first-mentioned washer part axially remote from said first-mentioned sleeve part and includes a further washer part located on a side of said further sleeve part axially remote from said first-mentioned washer part, said further sleeve part having an inside dimension which is less than the outside dimension of each said washer part and which is substantially greater than the inside dimension of each said washer part and the outside dimension of said rod.

6. The apparatus of claim 5, wherein said seal means includes two packing rings which are provided around said rod, each said packing ring being disposed within and having an outwardly facing surface engaging an inwardly facing surface of a respective one of said sleeve parts, and each said packing ring having an inwardly facing surface which is closely adjacent said rod.

7. The apparatus of claim 1, wherein said sleeve part has in an outwardly facing surface thereof a circumferential groove, and wherein said seal means includes an annular seal ring which is disposed in said groove and sealingly engages an inner surface of said opening through said housing.

8. The apparatus of claim 1, wherein said seal means includes two annular bushings which are each provided around said rod within said opening through said housing, said sleeve part and said washer part being disposed between said bushings.

9. The apparatus of claim 8, including resilient means for yieldably urging relative movement of said bushings in a direction toward each other.

10. The apparatus of claim 9, wherein said resilient means includes a helical compression spring which encircles said rod within said opening through said housing on a side of one of said bushings axially remote from said sleeve part and washer part, which has one end supported on said one of said bushings, and which has its other end supported on said housing.

11. The apparatus of claim 1, wherein said washer part has an outside dimension which is less than an inside dimension of said opening through said housing.

* * * * *